United States Patent
Nishiyama

(10) Patent No.: US 9,729,741 B2
(45) Date of Patent: Aug. 8, 2017

(54) IMAGE PROCESSING APPARATUS CAPABLE OF SETTING VARIOUS PROCESSES USING OPERATION SCREEN, PORTABLE TERMINAL, INFORMATION PROCESSING APPARATUS, CONTROL METHOD FOR IMAGE PROCESSING APPARATUS, AND STORAGE MEDIUM STORING CONTROL PROGRAM THEREFOR

(71) Applicant: CANON KABUSHIKI KAISHA, Tokyo (JP)

(72) Inventor: Kaori Nishiyama, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/882,513

(22) Filed: Oct. 14, 2015

(65) Prior Publication Data
US 2016/0112590 A1    Apr. 21, 2016

(30) Foreign Application Priority Data

Oct. 17, 2014    (JP) ................. 2014-212463

(51) Int. Cl.
*H04N 1/00* (2006.01)
*G06F 21/60* (2013.01)
*G06F 3/12* (2006.01)

(52) U.S. Cl.
CPC ....... *H04N 1/00514* (2013.01); *G06F 3/1204* (2013.01); *G06F 21/608* (2013.01);
(Continued)

(58) Field of Classification Search
CPC ........... H04N 1/00514; H04N 1/00517; H04N 1/0097; H04N 1/00392; H04N 2201/0096; G06F 3/1204; G06F 21/608
(Continued)

(56) References Cited

U.S. PATENT DOCUMENTS

| | | | |
|---|---|---|---|
| 8,896,856 B2 | 11/2014 | Uchikawa | |
| 2008/0144071 A1* | 6/2008 | Uchikawa | H04N 1/00915 358/1.14 |
| 2008/0189716 A1* | 8/2008 | Nakahara | G06F 21/608 718/105 |

FOREIGN PATENT DOCUMENTS

JP    2008152483 A    7/2008

OTHER PUBLICATIONS

Extended European Search Report issued in EP15188884.9, mailed Dec. 8, 2015.

* cited by examiner

*Primary Examiner* — Andrew H Lam
(74) *Attorney, Agent, or Firm* — Rossi, Kimms & McDowell LLP

(57) ABSTRACT

An image processing apparatus that is capable of reducing a user's burden about setting of setting information while maintaining a desired security level about the setting information. An operation screen displays information. A holding unit holds setting information about a job when a user logs out from the image processing apparatus during execution of the job. A display control unit displays the setting information held by the holding unit on the operation screen when the user who logged out from the image processing apparatus during execution of the job logs in to the image processing apparatus again, and to restrict the displaying on the operation screen when a user other than the user who
(Continued)

logged out from the image processing apparatus logs in to the image processing apparatus.

11 Claims, 6 Drawing Sheets

(52) U.S. Cl.
CPC ....... *H04N 1/0097* (2013.01); *H04N 1/00392* (2013.01); *H04N 1/00517* (2013.01); *H04N 2201/0096* (2013.01)

(58) Field of Classification Search
USPC ........................................................ 358/1.15
See application file for complete search history.

IMAGE PROCESSING APPARATUS CAPABLE OF SETTING VARIOUS PROCESSES USING OPERATION SCREEN, PORTABLE TERMINAL, INFORMATION PROCESSING APPARATUS, CONTROL METHOD FOR IMAGE PROCESSING APPARATUS, AND STORAGE MEDIUM STORING CONTROL PROGRAM THEREFOR

BACKGROUND OF THE INVENTION

Field of the Invention

The present invention relates to an image processing apparatus capable of setting various processes using an operation screen, a portable terminal, an information processing apparatus, a control method for the image processing apparatus, and a storage medium storing a control program therefor.

Description of the Related Art

When a user logs in to an image processing apparatus and sets up setting information about various processes using an operation screen of the image processing apparatus, various processes will be performed on the basis of the setting information in the image processing apparatus. At this time, setting items for setting up the setting information corresponding to the various processes on the basis of a display control job used for a display process of the operation screen concerned is displayed on the operation screen.

Incidentally, the user may log out from the image processing apparatus while setting the setting information to the setting items corresponding to the various processes. In this case, the display control job automatically stops and the setting information that was set up to the middle by the user who logged out is eliminated so that another user who will log in next can set up the setting information using the operation screen (for example, see Japanese Laid-Open Patent Publication (Kokai) No. 2008-152483 (JP 2008-152483A)).

However, since the setting information set up to the middle using the operation screen will be eliminated once a user logs out from an image processing apparatus according to the technique described in the above-mentioned publication, the user needs to set up the setting information from the beginning when the user logs in to the image processing apparatus again. That is, a user's burden about setting of the setting information increases.

On the other hand, for example, it can be considered that the setting information set up to the middle on the operation screen is held within a period after a user logs out from the image processing apparatus until the user concerned logs in to the image processing apparatus again in order to eliminate the necessity for setting the setting information from the beginning. In this case, if a user other than the user who logged out logs in to the image processing apparatus during the period, the other user can change the setting information currently held on the operation screen and can instruct execution of the process corresponding to the setting information, and therefore, a desired security level cannot be maintained about the setting information.

SUMMARY OF THE INVENTION

The present invention provides an image processing apparatus, a portable terminal, an information processing apparatus, a control method for the image processing apparatus, and a storage medium storing a control program therefor, which are capable of reducing a user's burden about setting of setting information while maintaining a desired security level about the setting information.

Accordingly, a first aspect of the present invention provides an image processing apparatus comprising an operation screen that displays information, a holding unit configured to hold setting information about a job when a user logs out from the image processing apparatus during execution of the job, and a display control unit configured to display the setting information held by the holding unit on the operation screen when the user who logged out from the image processing apparatus during execution of the job logs in to the image processing apparatus again, and to restrict the displaying on the operation screen when a user other than the user who logged out from the image processing apparatus logs in to the image processing apparatus.

Accordingly, a second aspect of the present invention provides a portable terminal comprising an operation screen, an execution instruction unit configured to make an image processing apparatus execute various processes based on setting information set up using the operation screen, an operation unit configured to receive a login operation by a user to the image processing apparatus and a logout operation of a user from the image processing apparatus, a holding unit configured to hold the setting information about a job when a user logs out from the image processing apparatus during execution of the job, and a display control unit configured to display the setting information held by the holding unit on the operation screen when the user who logged out from the image processing apparatus during execution of the job logs in to the image processing apparatus again, and to restrict the displaying on the operation screen when a user other than the user who logged out from the image processing apparatus logs in to the image processing apparatus.

Accordingly, a third aspect of the present invention provides an information processing apparatus comprising an operation screen, an execution instruction unit configured to make an image processing apparatus execute various processes based on setting information set up using the operation screen, an operation unit configured to receive a login operation by a user to the image processing apparatus and a logout operation of a user from the image processing apparatus, a holding unit configured to hold the setting information about a job when a user logs out from the image processing apparatus during execution of the job, and a display control unit configured to display the setting information held by the holding unit on the operation screen when the user who logged out from the image processing apparatus during execution of the job logs in to the image processing apparatus again, and to restrict the displaying on the operation screen when a user other than the user who logged out from the image processing apparatus logs in to the image processing apparatus.

Accordingly, a fourth aspect of the present invention provides a control method for an image processing apparatus with an operation screen, the control method comprising a holding step of holding setting information about a job when a user logs out from the image processing apparatus during execution of the job, and a display control step of displaying the setting information held in the holding step on the operation screen when the user who logged out from the image processing apparatus during execution of the job logs in to the image processing apparatus again, and of restricting the displaying on the operation screen when a user other than the user who logged out from the image processing apparatus logs in to the image processing apparatus.

Accordingly, a fifth aspect of the present invention provides a non-transitory computer-readable storage medium storing a control program causing a computer to execute the control method of the fourth embodiment.

According to the present invention, the user's burden about the setting information is reduced while maintaining the desired security level about the setting information.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
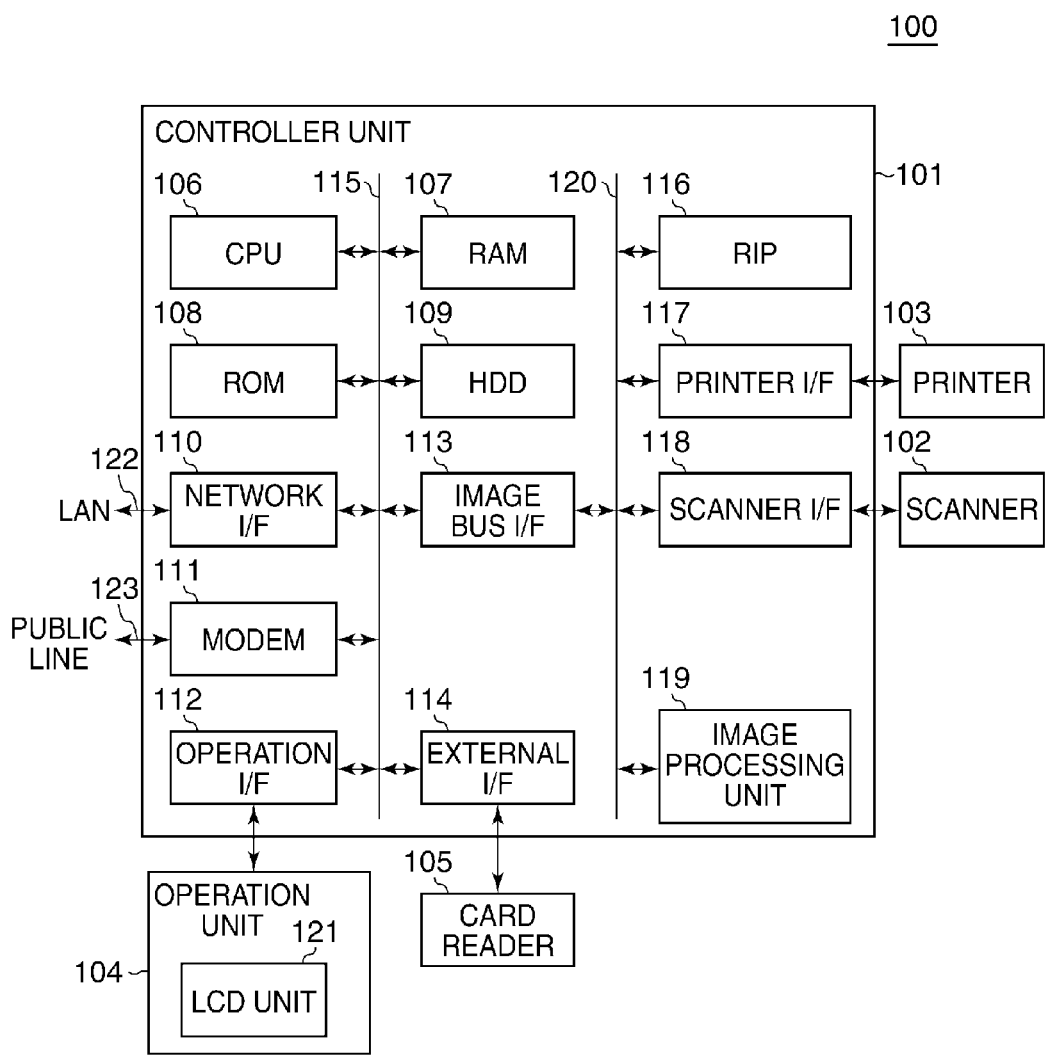
FIG. 1 is a block diagram schematically showing a configuration of an image processing apparatus according to an embodiment of the present invention.

FIG. 1 is a block diagram schematically showing a configuration of an image processing apparatus 100 according to an embodiment of the present invention.

As shown in FIG. 1, the image processing apparatus 100 is provided with a controller unit 101, a scanner 102, a printer 103, an operation unit 104, and a card reader 105. The controller unit 101 is provided with a CPU 106, a RAM 107, a ROM 108, an HDD 109, a network I/F 110, a modem 111, an operation I/F 112, an image bus I/F 113, and an external I/F 114. These components are mutually connected via a system bath 115. Furthermore, the controller unit 101 is provided with a raster image processor (hereinafter referred to as an "RIP") 116, a printer I/F 117, a scanner I/F 118, and an image processing unit 119. These components and the image bus I/F 113 are mutually connected via an image bus 120.

Figure 4:
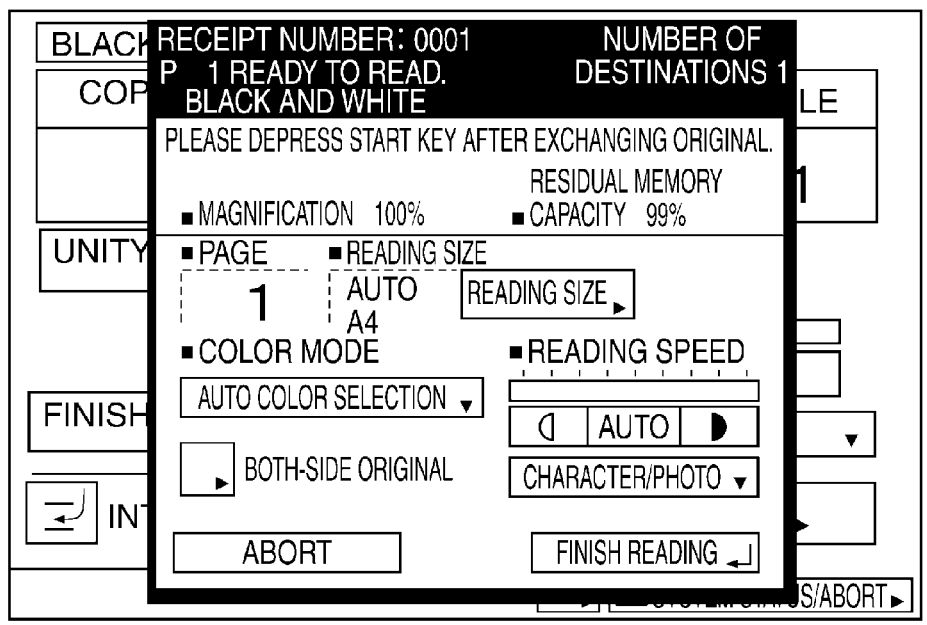
FIG. 4 is a view showing an example of a setting menu screen displayed on the LCD unit in FIG. 1.

The image processing apparatus 100 reads image data with the scanner 102 and prints the image data with the printer 103. The controller unit 101 performs data communication with the components (specifically, the scanner 102, the printer 103, the operation unit 104, and the card reader 105) to control the components. The scanner 102 irradiates an original in response to a control signal transmitted from the CPU 106, scans the original using a CCD line sensor (not shown), and generates image data by converting an image on the original into an electrical signal. The printer 103 prints the image data generated with the scanner 102 in response to the control signal transmitted from the CPU 106. The operation unit 104 is provided with an LCD unit 121. The LCD unit 121 displays a main menu as shown in FIG. 2 and a setting menu (a setting screen, see FIG. 4) mentioned later, for example.

Setting items of various processes that the image processing apparatus 100 performs corresponding to the setting menu are displayed on the setting menu. A user sets up pieces of setting information corresponding to the various processes by entering numerical values in the setting items, for example. That is, the user sets up the pieces of setting information corresponding to the various processes through the operation unit 104 (the LCD unit 121).

Figure 2:
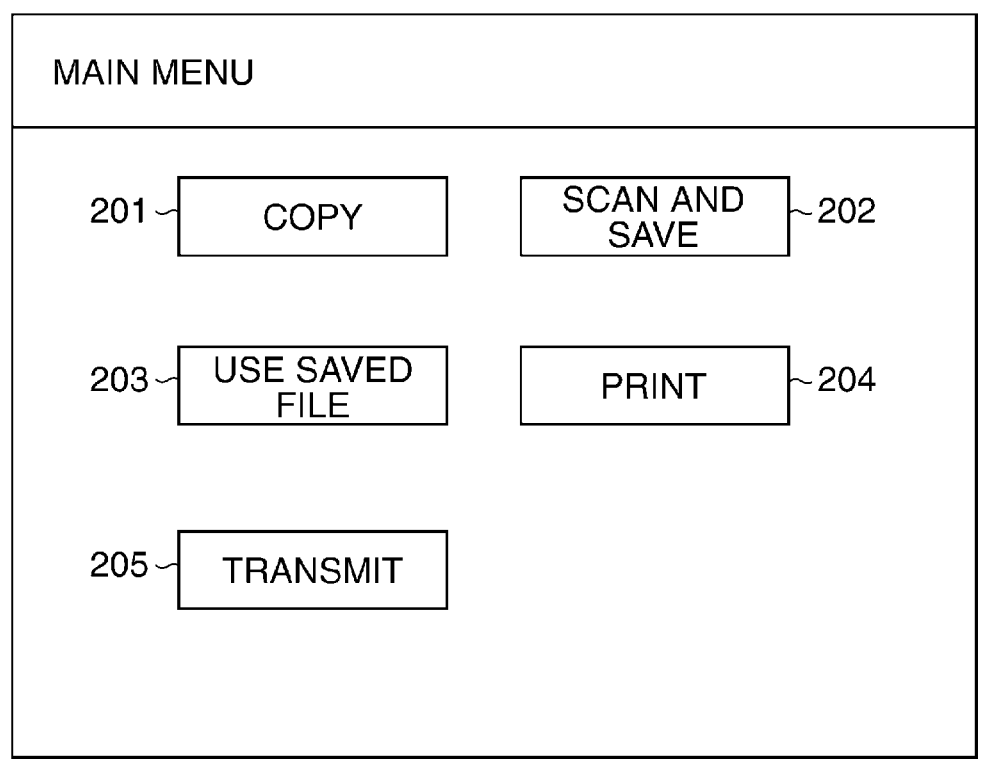
FIG. 2 is a view showing an example of a main menu screen displayed on an LCD unit shown in FIG. 1.

Moreover, the LCD unit 121 displays buttons 201 to 205 corresponding to functions of the image processing apparatus 100 in the main menu shown in FIG. 2. The button 201 is selected when a copy process that performs a scan process and a printing process is performed. The button 202 is selected when image data generated through the scan process is saved. The button 203 is selected when desired data used for the various processes among the various data stored in the HDD 109 is displayed, for example. The button 204 is selected when the printing process is performed. The button 205 is selected when image data generated by performing the scan process is transmitted to various devices, for example.

When a button displayed on the LCD unit 121 is selectively pressed by the user, the operation unit 104 transmits information about the pressed position on the LCD unit 121 to the CPU 106 through the operation I/F 112. Moreover, the operation unit 104 is provided with various operation keys (not shown), such as a start key, a stop key, an ID key, and a reset key.

The card reader 105 reads user information that identifies a user and is used in user authentication etc. from an IC card, and transmits the read user information to the external I/F 114. The user information that the external I/F 114 received is managed by the CPU 106. The CPU 106 controls the entire system of the image processing apparatus 101. The RAM 107 stores programs and various data that the CPU 106 runs, and is used as a temporary working area of the CPU 106. The ROM 108 stores a boot program and various control programs that the CPU 106 runs.

The HDD 109 stores various programs that the CPU 106 runs, image data, etc. The network I/F 110 performs data communication with the various devices that are connected to the LAN 122. The modem 111 performs facsimile communication with the various devices connected to a public line 123, for example. The operation I/F 112 performs data communication with the operation unit 104. For example, the operation I/F 112 transmits image data to the operation unit 104, and the operation unit 104 displays the received image data on the LCD unit 121.

Moreover, the operation I/F 112 receives the setting information that is set up by the user using the operation unit 104 and is transmitted from the operation unit 104. The image bus I/F 113 is a bus bridge that connects the system bus 115 and the image bus 120. The image bus 120 employs a PCI bus or IEEE 1394, and transmits image data at high speed. The RIP 116 develops vector data in a PDL code to bitmap image data, for example. The printer I/F 117 performs data communication with the printer 103. The scanner I/F 118 performs data communication with the scanner 102. The image processing unit 119 performs correction, processing, and editing to input image data, and performs correction, resolution conversion, etc. to print output image data.

Next, a login process and a logout process that are performed with the image processing apparatus 100 will be described with reference to FIG. 3 through FIG. 7.

Usually, since the setting information set up to the middle using the setting screen on the LCD unit 121 in the image processing apparatus 100 will be eliminated once a user logs out from the image processing apparatus 100, the user who logs in to the image processing apparatus 100 again needs to set up setting information from the beginning. That is, a user's burden about setting of the setting information increases.

On the other hand, for example, it can be considered that the setting information set up to the middle on the setting screen is held in a period after a user logs out from the image processing apparatus 100 until the user concerned logs in to the image processing apparatus 100 again in order to eliminate the necessity for setting the setting information from the beginning. In this case, if a user other than the user who logged out logs in to the image processing apparatus 100 during the period concerned, the other user can change the setting information currently held on the setting screen and can instruct execution of the process corresponding to the setting information, and therefore, a desired security level cannot be maintained about the process corresponding to the setting information. For example, the security level that prohibits a user other than the user who sets the setting information (hereinafter referred to as a "setup user") from instructing execution of the process corresponding to the setting information concerned cannot be maintained.

Figure 3:
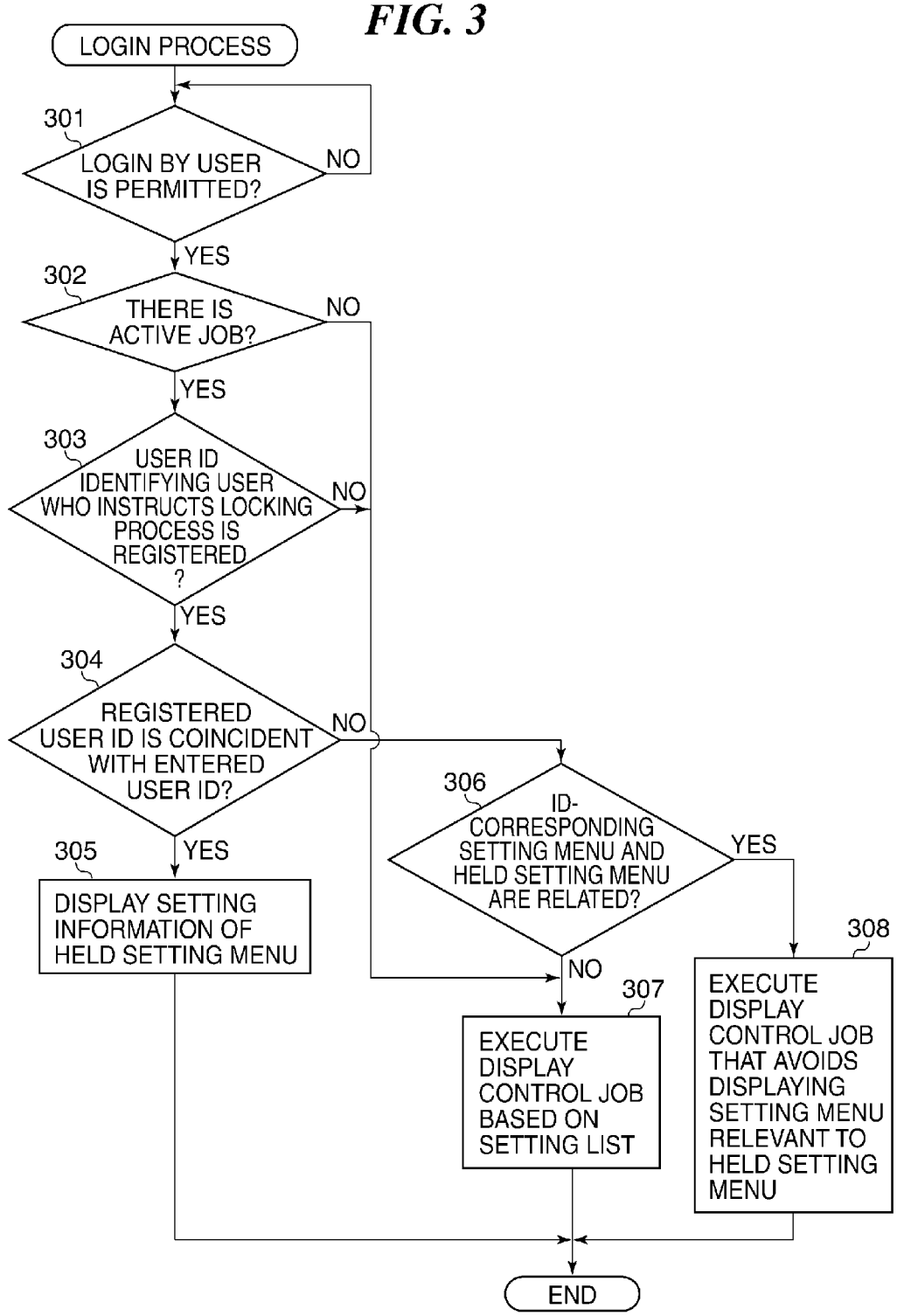
FIG. 3 is a flowchart for describing a login process performed with the image processing apparatus in FIG. 1.
Figure 6:
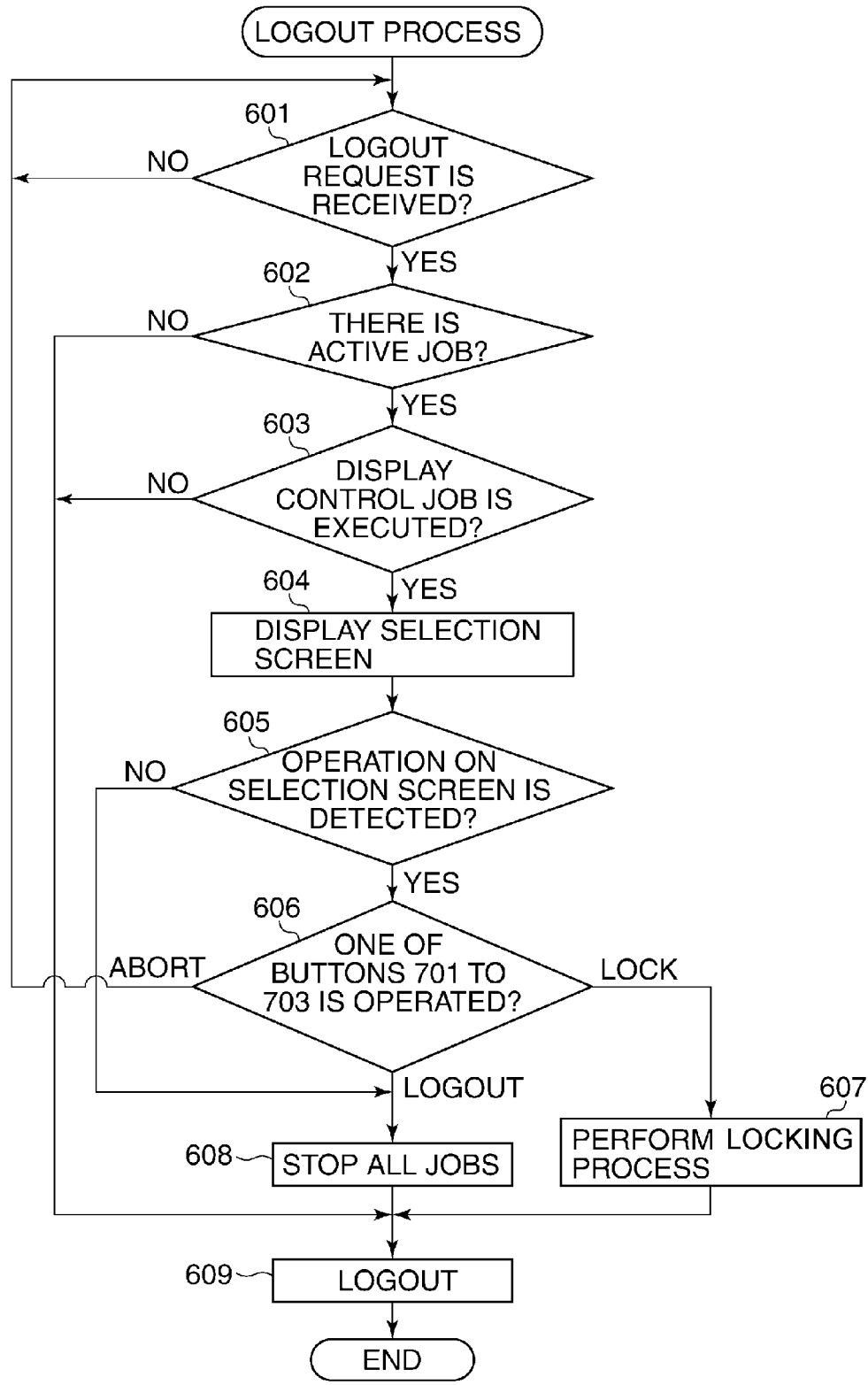
FIG. 6 is a flowchart for describing a logout process performed with the image processing apparatus in FIG. 1.

Corresponding to this, the processes in FIG. 3 and FIG. 6 hold the setting information set by the setup user using the LCD unit 121 when the setup user logs out from the image processing apparatus 100, and control so that the held setting information is not displayed on the LCD unit 121 when a user other than the setup user logs in.

FIG. 3 is a flowchart for describing the login process performed with the image processing apparatus 100 in FIG. 1.

The process in FIG. 3 and the process in FIG. 6 mentioned later are performed when the CPU 106 runs the various programs stored in the RAM 107 and the HDD 109.

As shown in FIG. 3, the CPU 106 first determines whether login of a user is permitted on the basis of a user ID entered through the operation unit 104 by the user concerned (step 301). When the login is permitted, the CPU 106 determines whether there is an active job (step 302).

As a result of the determination in the step 302, when there is no active job, the CPU 106 executes a display control job on the basis of a setting list shown in the following Table 1 registered beforehand, and displays a setting menu corresponding to each user according to execution of the display control job on the LCD unit 121 (step 307).

TABLE 1

| USER ID | SETTING SCREEN |
|---------|----------------|
| USER 1  | SCAN AND SAVE  |
| USER 2  | COPY           |
| USER 3  | PRINT          |

As shown in Table 1, the setting list includes the "user ID" that identifies a user and the "setting screen" in which a setting menu corresponding to a user ID is shown. For example, when login of the user 1 is permitted in the step 301, the setting menu corresponding to "SCAN AND SAVE" shown in Table 1 is displayed in the step 307. The CPU 106 finishes this process after performing the process in the step 307.

As a result of the determination in the step 302, when there is an active job, the CPU 106 determines whether a user ID that identifies a user who instructs a locking process in the locking process performed in step 607 in FIG. 6 mentioned later is registered (step 303).

Hereinafter, the locking process performed in the step 607 in FIG. 6 will be described before describing the process in FIG. 6 to facilitate the description of the embodiment.

The locking process is performed when a user logs out from the image processing apparatus 100. The setup user shall enter desired numerical values etc. (for example, "1" in "PAGE" and "AUTO A4" in "READING SIZE" in FIG. 4 correspond) in the setting items (for example, "PAGE" and "READING SIZE" in FIG. 4 correspond) in the setting menu (see FIG. 4) that is displayed on the basis of the display control job before performing the locking process.

When the locking process is performed in the step 607, the display control job is continuously performed on a background after that, and the setting menu is no longer displayed. However, since the execution of the display control job is not stopped, the setting menu is held as the setting information with the numerical values etc. entered in the setting items (a holding unit). That is, when the locking process is performed, the display control job is continuously executed and the setting menu is held. Accordingly, the numerical values etc. entered in the setting menu concerned, such as the sheet size and the number of pages, are held as the setting information.

On the other hand, when the locking process is performed, even if a user other than the user (setup user) who instructs the locking process logs in to the image processing apparatus 100 after that, the setting menu having the setting items to which the setup user entered the numerical values etc. is not displayed on the LCD unit 121 because the display control job corresponding to the setting menu concerned is executed on a background. Accordingly, the other user cannot operate the held setting menu.

Referring back to the process in FIG. 3, as a result of the determination in the step 303, when the user ID that identifies the user who instructs execution of the locking process is registered, the CPU 106 determines whether the registered user ID is coincident with the user ID that the user entered (hereinafter referred to as an "entered user ID") (step 304).

As a result of the determination in the step 304, when the registered user ID is coincident with the entered user ID, it is specified that the locking process is instructed by the user whose login is permitted in the step 301. Then, the CPU 106 displays the setting menu (for example, the setting menu shown in FIG. 4) held by performing the locking process on the LCD unit 121 together with the numerical values etc. that are entered by the user (setup user) who instructs the locking process (step 305).

As a result of the determination in the step 304, when the registered user ID is not coincident with the entered user ID, it is specified that the locking process is not instructed by the user whose login is permitted in the step 301. That is, it is specified that a user other than the setup user logs in. Then, the CPU 106 determines whether the setting menu corresponding to the user ID entered in the setting list show in Table 1 (hereinafter referred to as an "ID-corresponding setting menu") and the setting menu held according to the locking process (hereinafter referred to as a "held setting menu") are related mutually (step 306). Assuming that the held setting menu corresponds to the setting information used for performing the scan process, for example, when the ID-corresponding setting menu corresponds to the setting information used for performing the scan process, it is determined that the held setting menu and the ID-corresponding setting menu are related mutually in the step 306. When the ID-corresponding setting menu does not correspond to the setting information used for performing the scan process, it is determined that the held setting menu and the ID-corresponding setting menu are not related mutually.

Figure 5:
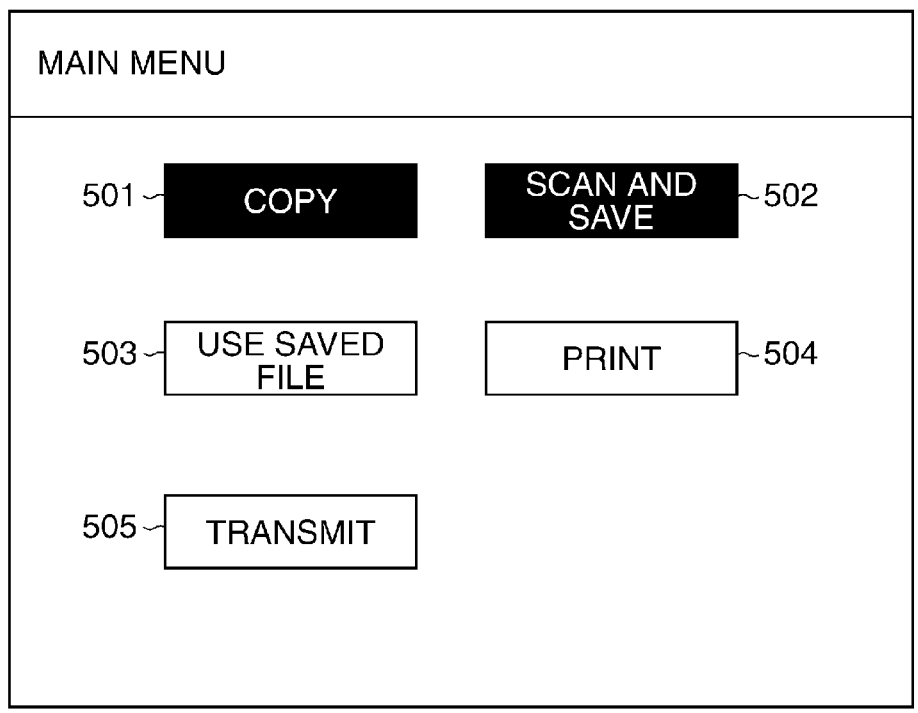
FIG. 5 is a view showing another example of the main menu screen displayed on the LCD unit shown in FIG. 1.

As a result of the determination in the step 306, when the held setting menu and the ID-corresponding setting menu are related mutually, the CPU 106 executes the display control job that avoids displaying the setting menu relevant to the held setting menu (namely, the ID-corresponding setting menu) in step 308 (a display control unit). Specifically, when the display control job in the step 308 is executed, a screen like a main menu screen shown in FIG. 5 is displayed on the LCD unit 121. In this screen, the buttons 501 and 502 for displaying the setting menus relevant to the held setting menu (the setting menu corresponding to the setting information used for performing the scan process in this case) are displayed so as not to be selectable, and the buttons 503 through 505 for displaying the setting menus irrelevant to the held setting menu are displayed so as to be selectable. The CPU 106 finishes this process after performing the process in the step 308.

When the user ID that identifies the user who instructed execution of the locking process is not registered as a result of the determination in the step 303, or when the ID-corresponding setting menu and the held setting menu are not related as a result of the determination in the step 306, the CPU 106 executes the display control job for displaying the setting menu (the setting menu irrelevant to the held setting menu) corresponding to the entered user ID in the setting list shown in Table 1 on the LCD unit 121, displays the setting menu corresponding to the entered user ID concerned on the LCD unit 121 (step 307), and finishes this process.

FIG. 6 is a flowchart for describing the logout process performed with the image processing apparatus 100 in FIG. 1.

As shown in FIG. 6, when receiving a logout request from the operation unit 104 (YES in the step 601), the CPU 106 first determines whether there is an active job (step 602).

As a result of the determination in the step 602, when there is an active job, the CPU 106 determines whether the display control job is executed (step 603).

Figure 7:
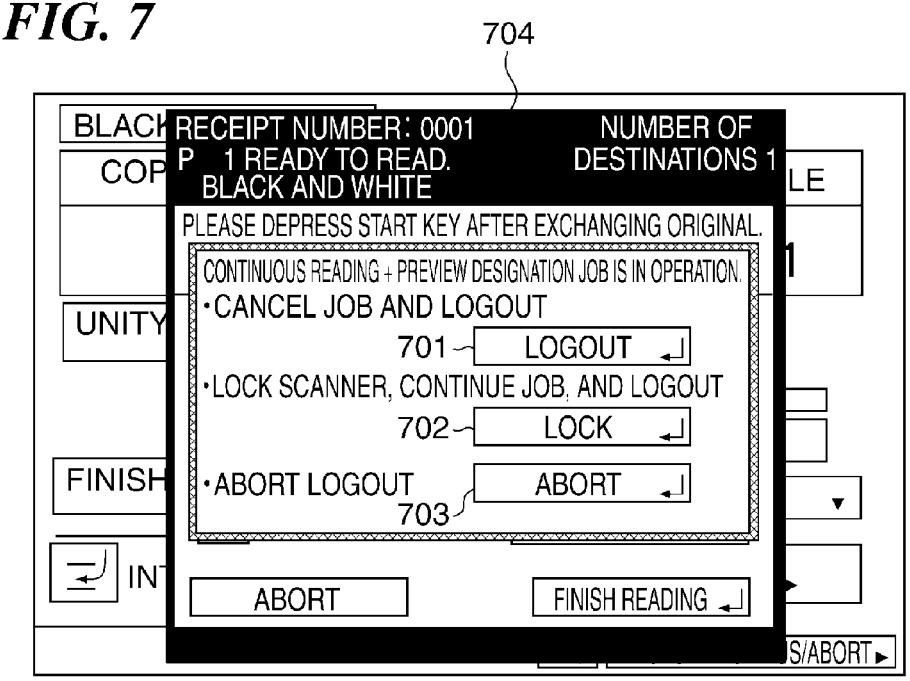
FIG. 7 is a view showing an example of a selection screen displayed on the LCD unit in FIG. 1.

As a result of the determination in the step 603, when the display control job is executed, the CPU 106 displays a selection screen 704 shown in FIG. 7 on the LCD unit 121 (step 604). In the selection screen 704 shown in FIG. 7, a logout button 701 to stop an active job and to log out, a lock button 702 to perform the locking process, and an abort button 703 to cancel the logout are displayed, for example, in addition to a message that indicates the active job.

Next, the CPU 106 determines whether one of the buttons 701 through 703 in the selection screen 704 is operated (selected) within a predetermined period (step 605).

As a result of the determination in the step 605, when one of the buttons 701 through 703 in the selection screen 704 is operated within the predetermined period, the CPU 106 decides a process that should be performed according to one of the buttons 701 through 703 that is operated (step 606).

In the step 606, when the lock button 702 is selected, the CPU 106 performs the locking process (step 607). Specifically, the CPU 106 continuously executes the display control job on a background, and holds the setting menu displayed according to the display control job together with the numerical values that the setup user entered in the setting items as the setting information. Furthermore, the CPU 106 registers the user ID that was entered when the user who selects the lock button 702 logged in to the image processing apparatus 100 as a user ID that identifies a user who instructs the locking process. Then, the CPU 106 proceeds with the process step 609.

When the logout button 701 is selected in the step 606, or when none of the buttons 701 through 703 in the selection screen 704 is operated within the predetermined period as a result of the determination in the step 605, the CPU 106 stops all the jobs including the display control job (step 608). Next, the CPU 106 executes the logout procedure (step 609), and finishes this process.

When the abort button 703 is selected in the step 606, the CPU 106 returns the process to the step 601.

When there is no active job as a result of the determination in the step 602, or when the display control job is not executed as a result of the determination in the step 603, the CPU 106 executes the logout procedure (the step 609), and finishes this process.

According to the processes in FIG. 3 and FIG. 6, the locking process is performed when the setup user logs out from the image processing apparatus 100, and the held setting menu is held together with the numerical values that the setup user entered in the setting items (step 607). Accordingly, when the setup user logs in to the image processing apparatus 100 again, the held setting menu is displayed on the LCD unit 121, which reduces the burden of the setup user about setting of the setting menu.

On the other hand, when a user other than the setup user logs in to the image processing apparatus 100, the buttons 501 through 505 are displayed on the LCD unit 121 so that the buttons 501 and 502 for displaying the setting menu relevant to the above-mentioned held setting menu cannot be selected. Accordingly, since a setting menu relevant to the held setting menu is not displayed on the LCD unit 121, the other user cannot instruct a change of the setting information set up in the held setting menu and execution of the process corresponding to the held setting menu. Accordingly, the user's burden about the setting of the setting menu is reduced while maintaining the desired security level about the process corresponding to the held setting menu.

In the process in FIG. 6, when the locking process is performed at the time when a user logs out, the display control job is continuously executed and the held setting menu is held. That is, the display control job holds the held setting menu approximately. Accordingly, since it is not necessary to prepare a memory for holding the held setting menu etc., a desired security level is maintained about the process corresponding to the held setting menu with a simple mechanism.

Moreover, in the process in FIG. 6, the selection screen 704 that allows a user to select the lock button 702 to perform the locking process is displayed on the LCD unit 121. This gives a user a chance to decide that the setting menu is needed to be held by performing the locking process, and improves a user's convenience.

Furthermore, in the process in FIG. 3, when the other user logs in, the setting menu of the process irrelevant to the held setting menu is displayed on the LCD unit 121. Accordingly, when the other user logs in, the other user can set up the setting information in the setting menu irrelevant to the held setting menu, which ensures the other user's convenience.

Although the present invention has been described using the embodiment, the present invention is not limited to the embodiment mentioned above.

For example, although the displaying of the held setting menu is avoided when the other user logs in the embodiment, it may be controlled so as not to perform the various processes that are based on the settings of the held setting menu even if the held setting menu is displayed (a processing unit).

Figure 8:
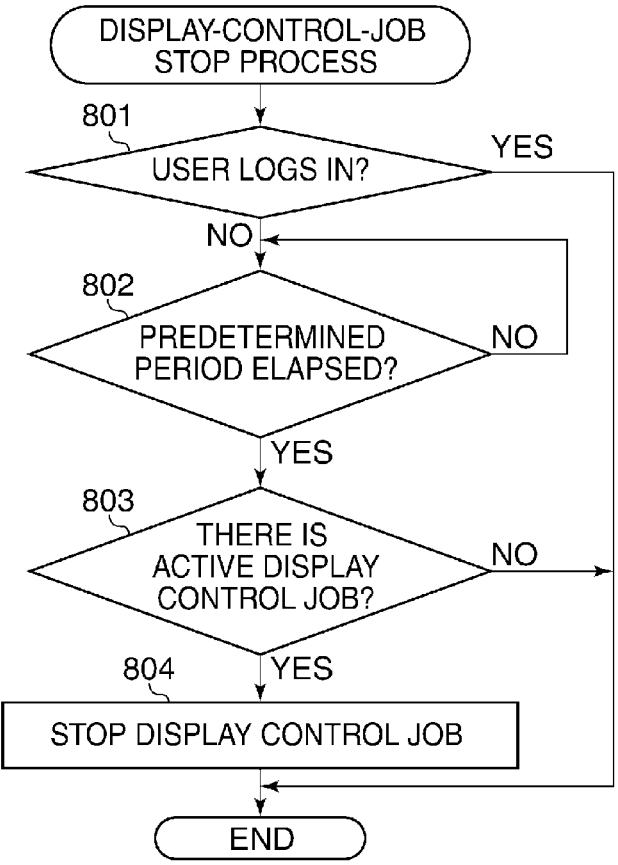
FIG. 8 is a flowchart for describing a display-control-job stop process performed with the image processing apparatus in FIG. 1.

Moreover, although the held setting menu is continuously held as long as the display control job is executed in the embodiment, the holding of the held setting menu may be stopped by performing a display-control-job stop process shown in FIG. 8, when the setup user who logged out does not log in during a predetermined period.

FIG. 8 is a flowchart for describing the display-control-job stop process performed with the image processing apparatus 100 in FIG. 1.

The process in FIG. 8 is performed when the CPU 106 runs the various programs stored in the RAM 107 and the HDD 109, and is performed in parallel to the processes in FIG. 3, and FIG. 6.

Specifically, the CPU 106 determines first whether a user logged in to the image processing apparatus 100 (step 801).

As a result of the determination in the step 801, when a user did not log in to the image processing apparatus 100, the CPU 106 starts measurement of time and determines whether a predetermined period elapsed (step 802). The predetermined period is set up so as not to spoil a user's convenience, and for example, 20 minutes period is set up in the embodiment. When the predetermined period (for example, 20 minutes) elapsed (YES in the step 802), the CPU 106 determines whether there is an active display control job (step 803). Here, the display control job in the step 803 includes the display control job that is continuously executed on a background in the step 606.

As a result of the determination in the step 803, when there is an active display control job, the CPU 106 stops the display control job concerned (step 804), and finishes this process. Since the display control job that approximately holds the held setting menu and is continuously executed on a background is also stopped at this time, the holding of the held setting menu is also stopped.

When a user logged in to the image processing apparatus 100 as a result of the determination in the step 801, or when there is no active display control job as a result of the determination in the step 803, the CPU 106 finishes this process.

According to the process in FIG. 8 mentioned above, the period within which the set-up setting menu is held (i.e., the period within which update of the setting menu corresponding to a user ID that identifies a user who logged out becomes invalid and within which another user cannot set up the setting menu concerned) is shortened to necessary minimum, which ensures an another user's convenience.

Moreover, for example, the predetermined period that is measured in the step 802 may be set up when a user selects the button 702 in the step 606 in FIG. 6. Accordingly, a user's request is reflected in the period holding the setting menu, which ensures a user's convenience.

Although the embodiment describes the case where the present invention is applied to an image processing apparatus with an operation screen, an applying target of the present invention is not limited to an image processing apparatus. For example, the present invention is applicable to a portable terminal that transmits a job to an image processing apparatus and makes an image forming apparatus execute a process on the basis of the transmitted job, information processing apparatuses, such as a job server and a client PC.

A portable terminal to which the present invention is applied includes an operation screen, an execution instruction unit that makes an image processing apparatus execute various processes based on setting information set up using an operation screen, an operation unit that receives a login operation by a user to the image processing apparatus and a logout operation of a user from the image processing apparatus, a holding unit that holds the setting information about a job when a user logs out from the image processing apparatus during execution of the job, and a display control unit that displays the setting information held by the holding unit on the operation screen when a user who logged out from the image processing apparatus during execution of the job logs in to the image processing apparatus again, and that restricts the displaying on the operation screen when a user other than the user who logged out from the image processing apparatus logs in to the image processing apparatus.

An information processing apparatus to which the present invention is applied includes an operation screen, an execution instruction unit that makes an image processing apparatus execute various processes based on setting information set up using an operation screen, an operation unit that receives a login operation by a user to the image processing apparatus and a logout operation of a user from the image processing apparatus, a holding unit that holds the setting information about a job when a user logs out from the image processing apparatus during execution of the job, and a display control unit that displays the setting information held by the holding unit on the operation screen when a user who logged out from the image processing apparatus during execution of the job logs in to the image processing apparatus again, and that restricts the displaying on the operation screen when a user other than the user who logged out from the image processing apparatus logs in to the image processing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-212463, filed Oct. 17, 2014, which is hereby incorporated by reference herein in its entirety.

What is claimed is:

1. An image processing apparatus including at least a printer or including at least a scanner comprising:
   a storage device; and
   a processor configured to execute computer executable instructions recorded on the storage device, the computer executable instructions including instructions that, when executed by the processor, cause the image processing apparatus to:
   display information on an operation screen;
   store setting information about a job for operating the printer or operating the scanner in accordance with a logout of a user from the image processing apparatus in a case where a screen for settings of execution of the job is displayed on the operation screen; and
   display, on the operation screen, a first type setting screen corresponding to the job, wherein the first type setting screen shows that a setting value based on the stored setting information is set to the image processing apparatus, in a case where the user who has logged out from the image processing apparatus logs in to the image processing apparatus again, and not display the first type setting screen for the user who logged out from the image processing apparatus on said operation screen in a case where a user other than the user who logged out from the image processing apparatus logs in to the image processing apparatus.

2. The image processing apparatus according to claim 1, wherein setting items for execution of the job are displayed on said operation screen, and
   wherein a display control job for performing control of displaying, on the operation screen, the setting items for the execution of the job is executed on a background even after the user has logged out, and the display control job executed on the background does not perform control of displaying on the operation screen the setting items after the user has logged out until the user longs in again.

3. The image processing apparatus according to claim 1, the computer executable instructions recorded on the storage device further cause the image processing apparatus to:
   avoid execution of the various processes based on the stored setting information in a case where the other user logs in.

4. The image processing apparatus according to claim 1, wherein storing of the setting information is stopped in a case where the user who has logged out does not log in again within a predetermined period.

5. The image processing apparatus according to claim 1, wherein a selection screen is displayed so as to prompt a user to select whether the setting information should be stored.

6. The image processing apparatus according to claim 1, wherein setting items that are not related to the stored setting information are displayed on said operation screen in a case where the other user logs in.

7. The image processing apparatus according to claim 1, wherein the first type setting screen is a setting screen of a copy function or a scan function.

8. A control method for an image processing apparatus that displays information on an operation screen, wherein the image processing apparatus includes at least a printer or includes at least a scanner, the control method comprising:
   storing setting information about a job for operating the printer or operating the scanner in accordance with a logout of a user from the image processing apparatus in a case where a screen for settings of execution of the job is displayed on the operation screen; and
   displaying, on the operation screen, a first type setting screen corresponding to the job, wherein the first type setting screen shows that a setting value based on the stored setting information is set to the image processing apparatus, in a case where the user who has logged out from the image processing apparatus logs in to the image processing apparatus again, and not displaying the first type setting screen for the user who logged out from the image processing apparatus on said operation screen in a case where a user other than the user who logged out from the image processing apparatus logs in to the image processing apparatus.

9. A non-transitory computer-readable storage medium storing a control program causing a computer to execute a control method for an image processing apparatus with an operation screen, wherein the image processing apparatus includes at least a printer or includes at least a scanner, the control method comprising:
   storing setting information about a job for operating the printer or operating the scanner in accordance with a logout of a user from the image processing apparatus in a case where a screen for settings of execution of the job is displayed on the operation screen; and
   displaying, on the operation screen, a first type setting screen corresponding to the job, wherein the first type setting screen shows that a setting value based on the stored setting information is set to the image processing apparatus, in a case where the user who has logged out from the image processing apparatus logs in to the image processing apparatus again, and not displaying the first type setting screen for the user who logged out from the image processing apparatus on said operation screen in a case where a user other than the user who logged out from the image processing apparatus logs in to the image processing apparatus.

10. An image processing apparatus comprising:
    a display device;
    a storage device; and
    a processor configured to execute computer executable instructions recorded on the storage device, the computer executable instructions including instructions, that when executed by the processor, cause the image processing apparatus to:
    execute a scan job including a scan process based on an instruction of a user during the user's login;
    store an attribute information related to the scan job as part of a logout process performed in accordance with receipt of an instruction causing the user, who instructed execution of the scan job, to log out during the execution of the scan job, wherein the scan job is kept and capable of being successively executed even after the user has logged out from the image processing apparatus;
    perform control of displaying, on the display device, a scan screen based on the stored attribute information with information regarding the kept scan job, in a case where login of a first user is accepted and the first user who logs in to the image processing apparatus is coincident with the user who instructed the execution of the kept scan job; and not display a screen, to a user who is not verified as the user who instructed the execution of the kept scan job, for changing a setting of the kept scan job which the user instructed execution of before logging out, and perform control of permitting executing at least one job which is different from the kept scan job which the user instructed execution of before logging out in a case where login of a second user is accepted and the second user who logs in to the image processing apparatus is not coincident with the user who instructed the execution of the kept scan job.

11. The image processing apparatus according to claim 10, wherein the scan job including the scan process includes a scan job of obtaining an image by scanning an original or a copy job of printing an image obtained by scanning an original, and the at least one job which is different from the kept scan job includes a print job.

* * * * *